United States Patent [19]

Bleeke et al.

[11] Patent Number: 4,503,417
[45] Date of Patent: Mar. 5, 1985

[54] LEAK PROOF POSITION SENSOR WITH PERMANENT MAGNET SHAFT

[75] Inventors: William F. Bleeke, Vandalia, Mich.; James E. Greve, South Bend, Ind.

[73] Assignee: CTS Corporation, Elkhart, Ind.

[21] Appl. No.: 388,124

[22] Filed: Jun. 14, 1982

[51] Int. Cl.³ .......................................... H01C 10/00
[52] U.S. Cl. .................................. 338/176; 338/184; 338/199
[58] Field of Search ............... 338/176, 180, 181, 183, 338/184, 164, 199; 73/119 A

[56] References Cited

U.S. PATENT DOCUMENTS

| 3,271,721 | 9/1966 | Gordon | 338/183 |
| 4,304,201 | 12/1981 | Bleeke | 123/339 |
| 4,356,979 | 11/1982 | Dobler | 73/119 A X |
| 4,416,150 | 11/1983 | Kago et al. | 73/119 A |

FOREIGN PATENT DOCUMENTS

| 1262654 | 2/1972 | United Kingdom. |
| 1266955 | 3/1972 | United Kingdom. |
| 2049948A | 12/1980 | United Kingdom. |
| 1597350 | 9/1981 | United Kingdom. |

Primary Examiner—C. L. Albritton
Attorney, Agent, or Firm—Rodger H. Flagg

[57] ABSTRACT

A leak tight position sensor or transducer (10) comprising a housing (12) having a cavity (32) with an opening (14) in one side and an aperture (16, 26) in each end of the housing (12). Located within the cavity (32) is a drive block (34) having bushing (36) with a threaded aperture (37) receiving the threaded end (42) of a shaft (40) made of a permanent magnet material. The threaded end (42) of the magnetic shaft (40) has a flat (44) and the other end (46) of the shaft is journalled in an aperture (16) of the housing (12). A metallic contactor (38) attached to the drive block (34) wipably engages an electrical circuit (54) printed on the interior surface (52) of a ceramic substrate (50) proportioned to seal the housing opening (14). Electrical wires (60) inserted through openings (58) in the substrate (50) are soldered to the circuit (54) and not only complete electrical connection and securement of the wires (60) to the circuit (54), but seal the openings (58) in the ceramic substrate (50). The ceramic substrate (50) is joined to the housing by an adhesive (70) which provides a leak tight sealing of the perimeter of the ceramic substrate (50) to the housing opening (14). The transducer (10) can be attached to a rotary diesel injection pump whereby fuel may enter into the interior of the housing (12) without leakage therefrom, and can be internally calibrated while attached to the pump.

22 Claims, 7 Drawing Figures

LEAK PROOF POSITION SENSOR WITH PERMANENT MAGNET SHAFT

DESCRIPTION

1. Technical Field

This invention relates to the use of position sensors for automotive applications.

2. Background Art

A wide variety of potentiometer constructions have been utilized to transduce a change in position to a change of voltage output and thereby provide an output corresponding to the position. With the increase in governmental automotive pollution control standards, the use of electrical controls and sensors in automotive engines has increased greatly. These sensors detect engine data such as change in throttle position, temperature, pressure flow rates, and so fourth. The outputs of the various sensors are communicated to a microprocessor which digests the information from the sensors and effects adjustments of various engine controls, and thereby maintains the operating parameters necessary for meeting required emission and fuel economy standards.

There is a need for a potentiometer to be used as an externally mounted sensor on a rotary diesel injection pump, that can be mounted outside the low pressure side of the pump and sense internal pump part position without permitting leakage of diesel fuel.

Such a construction requires that the sensor be sealed so that any fluid entering the sensor housing will not leak therefrom. This construction requires that the sensor housing have complete sealing integrity. The present invention comprises a housing having one side open and a ceramic substrate proportioned to enclose the opening, a sealing material joining the substrate to the housing and maintaining the sealing integrity of the housing. Electrical wires are inserted through apertures in the substrate and solder not only attaches the wires to an electrical circuit printed on the inside of the ceramic substrate, but seals the apertures and electrical wires so that fluid will not leak through the lead wires from the interior of the housing. Gordon U.S. Pat. No. 3,271,721 entitled "Rectilinear Potentiometer" and issued Sept. 6, 1966 illustrates the use of solder to seal a substrate aperture having an electrical wire inserted therethrough, for the purpose of keeping dust and moisture from entering the interior of the potentiometer housing. However, the sensor of the present invention must have complete sealing integrity such that no fluid will leak from the housing.

It is also necessary that the transducing of the movement of the internal pump part to an electrical output, be effected without causing abnormal operation of the internal pump part. The use of a return spring is unacceptable because of the force exerted against the part. Bleeke U.S. Pat. No. 4,304,201 issued Dec. 8, 1981, and entitled "Method and Apparatus for Step Positioning an Engine Speed Control" and owned by the same assignee, discloses an engine speed control utilizing transient magnetic/mechanical couplings. However, the sensor for the present application must maintain a constant and permanent attachment to the internal pump part.

DISCLOSURE OF THE INVENTION

The leak proof position sensor or transducer comprises a housing having an interior cavity with one housing side open and an aperture located in an end wall of the housing. Located within the housing cavity is a drive block positioned for slideable movement within the cavity and having a threaded aperture through the drive block. Secured to one side of the drive block is a metallic contactor having resilient wiper blades extending outwardly. A shaft made of a machinable grade of permanent magnet material has a threaded end received in the threaded aperture of the drive block and the other end of the shaft is journalled in the aperture in the end wall of the housing. Located in the opposite end wall of the housing is a threaded opening which receives a threaded bolt having a sealing O-ring captivated beneath its head. A ceramic substrate proportioned to cover the open side of the housing encloses and seals the interior cavity of the housing. On the interior side of the substrate is disposed an electrical circuit to which are attached electrical leads. The electrical leads or wires are inserted through apertures in the substrate, and the apertures are sealed by solder. The ceramic substrate is joined to the housing by an adhesive which provides a leak tight sealing of the ceramic substrate to the perimeter of the housing opening. The resilient fingers of the contactor wipably engage the resistance paths of the electrical circuit as the shaft moves longitudinally, the shaft being magnetically coupled to an interior part of a rotary diesel injection pump to which the sensor is mounted. The screw can be removed from the opposite end wall of the housing, and an adjustment tool inserted into the threaded opening to seal the opening and provide internal calibration of the sensor while the sensor is attached to the rotary diesel injection pump.

BEST MODE FOR CARRYING OUT THE INVENTION

Figure 1:
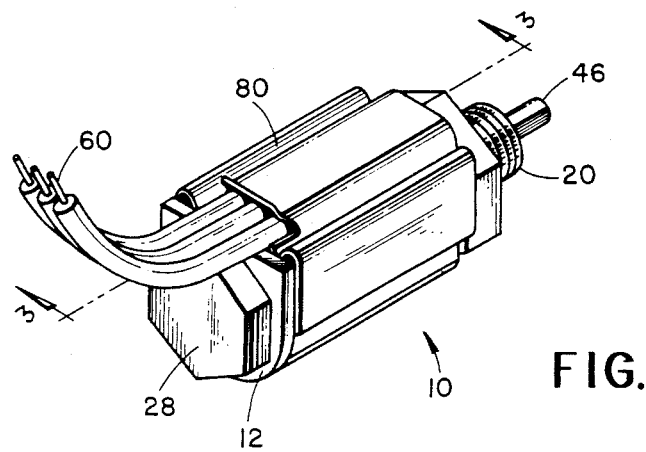
FIG. 1 is an isometric view of the leak proof position sensor of the present invention.
Figure 2A:
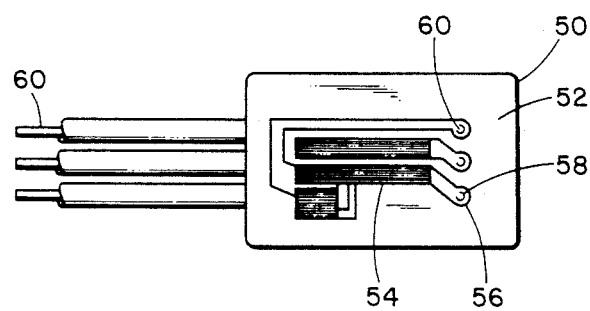
FIG. 2A is a view of the printed circuit board and solder sealing of the ceramic substrate, taken along view lines 2a—2a of FIG. 2.
Figure 3:
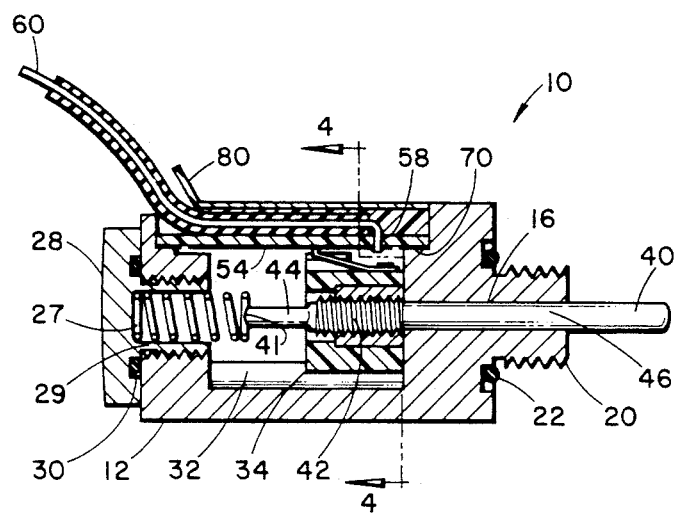
FIG. 3 is a section view taken along view line 3—3 of FIG. 1.
Figure 2:
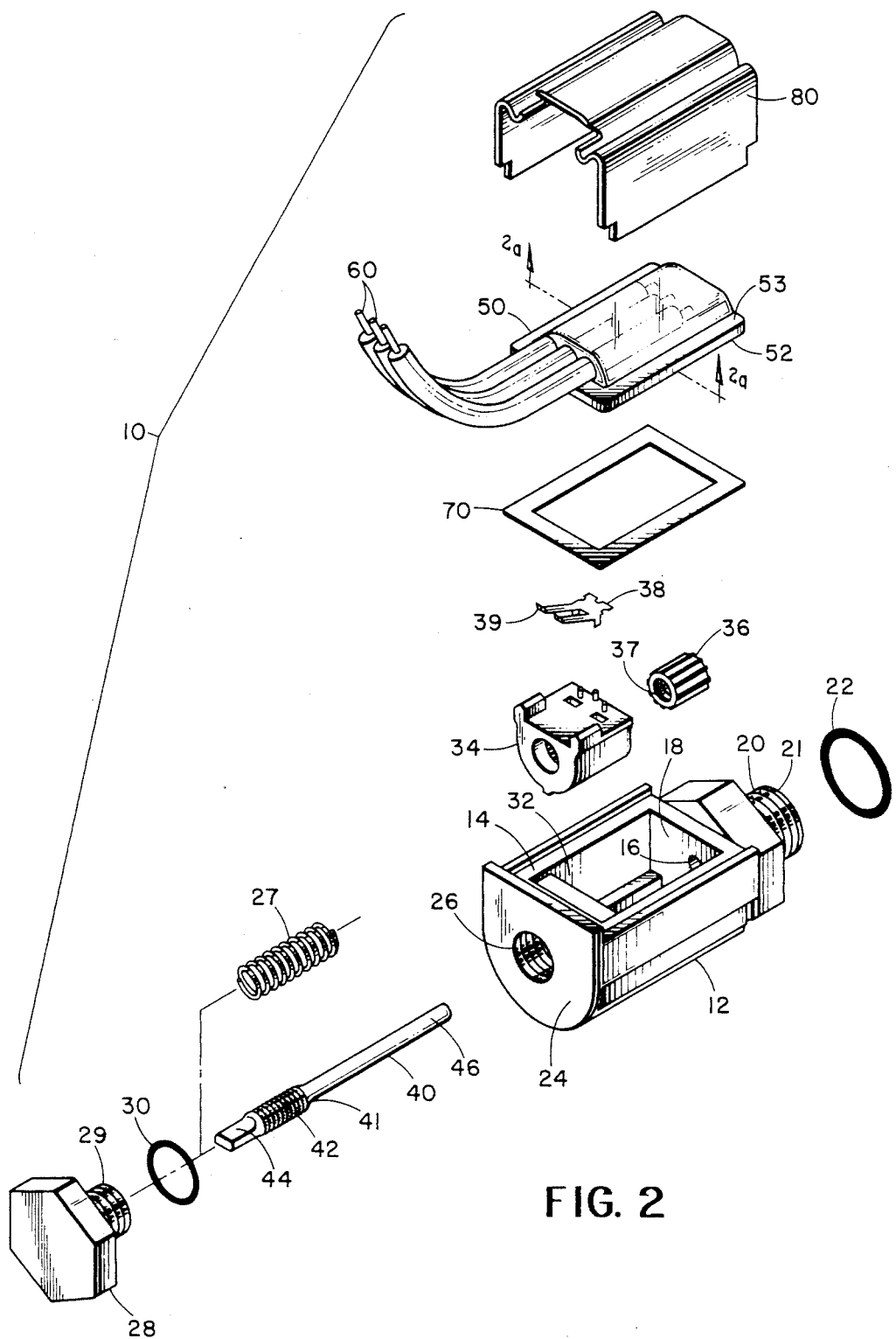
FIG. 2 is an exploded isometric view of the leak proof position sensor.
Figure 4:
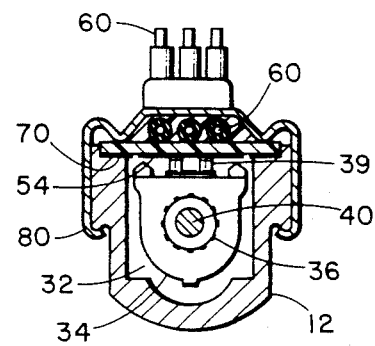
FIG. 4 is a section view taken along view line 4—4 of FIG. 3.

Referring now to the drawings, and particularly FIGS. 1 and 2, the leak proof position sensor or potentiometer is designated generally be reference numeral 10. The sensor 10 comprises a die cast housing 12 having an opening 14. The die cast housing 12 has an aperture 16 located in end wall 18, aperture 16 passing through exterior threaded bushing 20 around which is fitted an O-ring seal 22. End wall 24 of housing 12 has disposed therein threaded aperture 26, into which is fitted threaded hollow shaft 29 of bolt 28 having O-ring seal 30 positioned beneath the bolt head. Located within hollow shaft 29 is spring 27.

Located within the die cast housing 12 is cavity 32. Positioned within cavity 32 is drive block 34 which has a bushing 36 with threaded opening 37 passing therethrough. Secured to drive block 34 by heat staking methods well known in the art, is metallic contactor 38. Metallic contactor 38 has resilient wiper arms 39 extending outwardly from drive block 34. Extending through the threaded opening 37 in bushing 36, is shaft 40 made of a machinable grade permanent magnet material such as Indalloy made by Indiana General Magnet Products, Inc. Located about end 41 of shaft 40, are adjusting threads 42 and flat 44. The adjusting threads 42 are coupled with the threaded opening 37 to secure the drive block 34 to the magnetic shaft 40. End 46 of magnetic shaft 40 is journalled in aperture 16 and extends beyond end 21 of bushing 20. The magnetic shaft 40 and drive block 34 are assembled by placing the drive block 34 within the cavity 32, inserting magnetic shaft end 46 through aperture 26 and opening 37, and then screwing the adjusting threads 42 into threaded opening 37.

A ceramic substrate 50 comprises a housing wall proportioned to fit over the opening 14 of die cast housing 12 (see FIGS. 2 and 2a). The interior surface 52 of ceramic substrate 50 has an electrical circuit 54 printed thereon, and terminations 56 are located about apertures 58. Wires 60 are positioned along the surface 53 of substrate 50 and each pass through an aperture 58. The end of each wire is soldered to a termination 56 adjacent the respective aperture 58. The solder not only secures each of the wires 60 mechanically and electrically to a termination, but flows between the strands of the individual wires and effects a complete sealing of the apertures 58. A potting compound such as a rubber epoxy, is placed upon the wires 60 in order to secure the wires and prevent corrosion and movement which could damage the solder seals at apertures 58. Located about the perimeter of the ceramic substrate 50 on the interior surface 52, is an adhesive material 70. An adhesive material, such as an aircraft grade laminating epoxy FM-53 made by American Cyanimid Corporation, is cut in a preform and placed on the surface 52, and then heat treated to effect a complete fluid tight sealing of the ceramic substrate 50 to the die cast housing 12. Positioned over substrate 50 and enclosing the sides of housing 12 is a protective cover 80.

Figure 5:
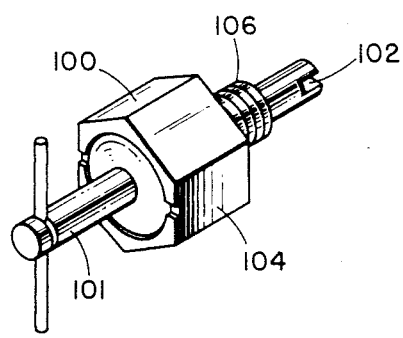
FIG. 5 illustrates an isometric view of the adjustment tool for effecting an internal calibration of the sensor.

FIG. 5 illustrates an adjustment tool 100 used to calibrate the leak proof position sensor while installed. The adjustment tool 100 has an adjusting shaft 101 with slotted end 102 shaped for receiving the flat 44 of magnetic shaft 40. The adjusting shaft 101 is fitted within head 104 having an internal O-ring seal 105, threaded bushing 106, and O-ring seal 108.

The leak proof position sensor 10 is designed for use with an automotive diesel injection pump (not shown) requiring an externally mounted sensor located on the low pressure side of the pump housing. The sensor must communicate the position of an internal part of the diesel injection pump without imposing any force upon the movement of the part and not permitting any leakage of diesel fuel. Thus, the sensor 10 is mounted by screwing the threaded bushing 20 into a threaded opening in the wall of the diesel injection pump, the connection being sealed by the O-ring 22. As the pump operates, diesel fuel enters into the cavity 32 but will not leak therefrom because of the sealed construction of the sensor.

Due to the sensitivity of the internal parts of the diesel injection pump, it was found that a full length return spring was unacceptable because of the forces it imposed upon the movement of the internal parts of the pump. Therefore, the shaft 40 was made of a permanent magnet material in order to effect a continuous magnetic coupling of the end 46 to an internal part of the diesel injection pump. When the magnetic coupling is accomplished, the shaft 40 will follow the internal pump part and offer no resistance to the operational performance of the part. In order to prevent any decoupling of the shaft 40 from the internal part of the pump when the shaft end 46 is almost fully retracted into the bushing 20, the shaft end 41 is received in the spring 27 so that at near full retraction the drive block 34 engages the spring 27 which biases the shaft end 46 outwardly from the bushing 20 for engagement with the internal pump part.

OPERATION

The leak proof position sensor is assembled by placing the drive block 34 into the cavity 32, inserting the end 46 of magnetic shaft 40 through the aperture 26, opening 37, and aperture 16, and then mating the threads 42 with the threads of opening 37, the shaft 40 being journalled in the aperture 16 with the end 46 extending beyond end 21. Ceramic substrate 50 having adhesive material 70 is positioned over opening 14, such that the resilient wiper arms 39 of contactor 38 engage the circuit 54 on surface 52. Heat bonding effects a complete sealing of the ceramic substrate 50 to housing 12, the seal being of leak proof integrity to prevent leakage of diesel fuel from the interior of the housing. Cover 80 is attached to the housing 12, and potting material is injected under the cover to secure the wires and protect the wires from corrosive substances.

Figure 6:
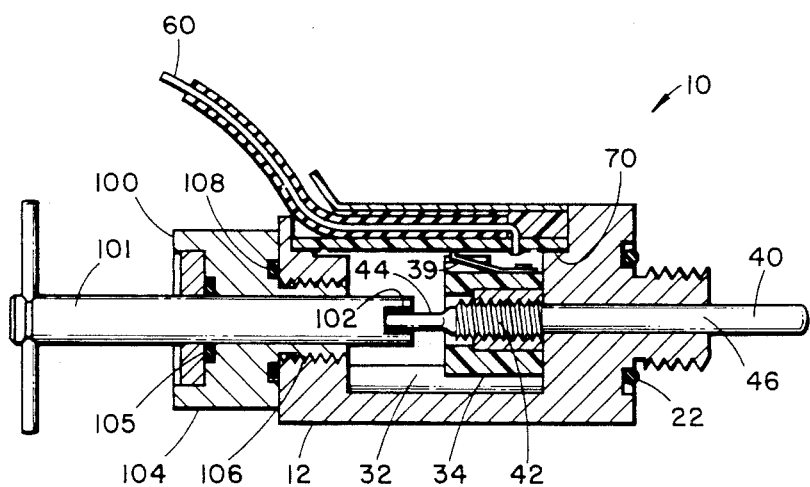
FIG. 6 is a section view of the adjustment tool attached to the sensor.

The die cast housing 12 is then attached to a diesel fuel pump by threading the bushing 20 into a threaded opening (not shown) in the side wall of the pump. After the diesel fuel pump has been in operation, if an internal calibration of the sensor or potentiometer 10 is required, the threaded bolt 28 may be removed and the adjustment tool 100 attached to the die cast housing 12 (see FIG. 6). The adjustment tool 100 is attached to the sensor 10 by threading the threaded bushing 106 within the threaded aperture 26, and then mating the slotted end 102 with the flat 44 of the shaft 40. The shaft 101 is then rotated to adjust the position of the drive block 34 and attached contactor 38. Because the shaft is guided longitudinally, such rotation advances or retracts the block 34 relatively to the shaft 40. The aperture 26 is sealed by the O-ring seal 108, so that the sensor 10 may be calibrated during operation of the fuel pump without leakage of fuel through the sensor 10. The adjustment tool 100 is then detached from the housing 12, and the bolt 28 is reinserted in aperture 26 by threading shaft 29 of the bolt 28 into the threaded aperture 26.

The leak proof position sensor can be mounted externally of a diesel injection pump and internally calibrated without removal of the sensor from the fuel pump. Additionally, the coupling of the shaft to the internal pump part whose position is to be sensed, is accomplished without imposing any forces upon the internal part. The various sealing means utilized in the construction allow diesel fuel to enter into the housing without leakage of diesel fuel therefrom.

INDUSTRIAL APPLICABILITY

The leak proof position sensor with permanent magnet shaft can be utilized to provide an electrical output without allowing any leakage of fluid and providing for resettable internal calibration.

CONCLUSION

Although the present invention has been illustrated and described in connection with an example embodiment, it will be understood that this is illustrative of the invention, and it is by no means restrictive thereof. It is reasonably to be expected that those skilled in the art can make numerous revisions and additions to the invention and it is intended that such revisions and additions will be included within the scope of the following claims as equivalents of the invention.

We claim:

1. A leak proof transducer comprising a housing having an interior cavity, a housing opening exposing said cavity and an aperture in said housing opening into said cavity, shaft means having mating means and adjusting means, carrier means connected to said shaft means by said adjusting means, said carrier means having contactor means connected thereto, one end of said shaft means received in the aperture of said housing, means for covering said housing opening and comprising wall means having electrical circuit means disposed on one side thereof and at least one opening through said wall means, electrical connection means extending through said opening in the wall means and connected to said electrical circuit means, means for sealing said opening in the wall means and securing said electrical connection means in electrical contact with the electrical circuit means, and means for sealing said wall means onto the housing opening so that fluid will not leak from said cavity through said housing opening.

2. The transducer of claim 1, wherein said shaft means comprises a permanent magnet material for effecting a magnetic coupling of said shaft means for moving said shaft means.

3. The transducer in accordance with claim 1, further comprising a potting substance disposed on said electrical connection means.

4. The transducer in accordance with claim 1, wherein said carrier means comprises a drive block having a threaded opening receiving the adjusting means of the shaft means.

5. The transducer in accordance with claim 1, wherein said housing has a second aperture and a removable closure means disposed in said second aperture, the removable closure means having a sealing means to maintain the leak proof integrity of said housing.

6. The transducer in accordance with claim 5, further comprising an adjustment tool means having sealing means and substitutable for the removable closure means in sealing relationship with the housing, to maintain the integrity of said leak proof housing while engaging the mating means of said shaft means to effect a calibration of said transducer.

7. The transducer in accordance with claim 1, further comprising a cover disposed about said wall means.

8. A leak proof transducer responsive to a fluid flow control means comprising a housing having an interior cavity, a housing opening exposing said cavity and an aperture opening into said cavity, shaft means made of a permanent magnet material, carrier means adjustably secured to said shaft means, said carrier means located in the interior cavity of said housing and said shaft means received in the aperture in said housing, contactor means secured to said carrier means for movement therewith, wall means having an electrical circuit means located thereon and at least one aperture therethrough, said wall means disposed over said housing opening to seal said opening and positioned for engagement of said contactor means with said electrical circuit means, electrical connection means disposed in the aperture through said wall means, means for sealing the aperture in said wall means and securing said electrical connection means to said electrical circuit means to complete an electrical connection therewith, and means for biasing said shaft means responsive to said fluid flow control means while maintaining fluid under pressure within said cavity, said means for biasing said shaft means being magnetically coupled to said shaft means, such that said contactor means is displaced along said electrical circuit means responsive to said fluid control means, said transducer being of a leak proof construction whereby fluid in the cavity of said housing means does not leak from said cavity.

9. The transducer in accordance with claim 8, wherein said housing has a threaded opening within an end of said housing and which is enclosed by a threaded removable closure means which seals said end of the housing.

10. The transducer in accordance with claim 9, further comprising adjustment tool means which, after removal of the removable closure means, may be inserted within the threaded opening and coupled with said shaft means whereby actuation of said adjustment tool means effects calibration of said transducer.

11. The transducer in accordance with claim 8, wherein the adjustable securement between said carrier means and said shaft means comprises adjusting threads on said shaft means received in a threaded aperture within said carrier means.

12. The transducer in accordance with claim 8, further comprising mating means located at one end of said shaft means, and adjusting tool means, said mating means being shaped for receiving a complementary shaped end of said adjusting tool means.

13. The transducer in accordance with the claim 8, further comprising an adhesive material disposed about the perimeter of said wall means and effecting a leak tight securement of said wall means to said housing.

14. The transducer in accordance with the claim 8, wherein the seal of said wall means to said housing comprises an adhesive preform disposed about the perimeter of said wall means and which effects said seal after heat treatment.

15. A transducer responsive to fluid flow control means in an injection pump comprising a housing having a plurality of walls enclosing an interior cavity and an aperture in a wall of said housing, one of said walls having electrical circuit means disposed on a side thereof and electrical connection means connected to said circuit means, shaft means made of a permanent magnet material, carrier means disposed in said cavity and having contactor means secured thereto, said contactor means in contact with said circuit means, means for biasing said shaft means responsive to movement of said fluid flow control means in said pump, effecting movement of said shaft means magnetically coupled to said biasing shaft means, where said movement of said shaft means is effected through said magnetic coupling to displace said contactor means along said circuit means and produce a controlled variable electrical output responsive to said fluid flow.

16. A process for transducing a mechanical movement, responsive to a fluid flow control means to an electrical output, comprising the steps of disposing a shaft means attached to a carrier means within the interior of a housing, said carrier means having contactor means attached thereto and said shaft means received in an aperture of said housing, providing a wall means of covering an opening exposing the interior of said housing, electrical circuit means disposed on an interior side of said wall means and electrical connection means extending through an aperture in said wall means, securing said electrical connection means to said electrical circuit means by means of a sealant disposed in said aperture in order to connect said electrical connection means to said circuit means, providing an adhesive and sealing means about said wall means, securing said wall means to said housing to cover the opening, and providing a magnetic coupling of said shaft means to a means for effecting movement responsive to said fluid flow control means and said movement means operating within a fluid, whereby fluid may enter into the interior of said housing without leaking therefrom, said movement means effecting displacement of the shaft means to effect movable contact of said contactor means with said electrical circuit means to effect an electrical output responsive to said fluid flow control means.

17. The process in accordance with claim 16, further comprising the step of locating a threaded opening in said housing and providing a sealable removable closure means within said threaded opening.

18. The process in accordance with claim 17, further comprising the steps of removing said sealable removable closure means and inserting a sealed adjustment tool means within said threaded opening, and effecting a coupling of said adjustment tool means with said shaft means such that the transducer may be calibrated while coupled with said means for effecting mechanical movement.

19. The process in accordance with claim 18, wherein said calibration is effected while the interior of said housing contains fluid therein.

20. The process in accordance with claim 16, further comprising the step of providing a potting material means about an exterior side of said wall means and said electrical connection means.

21. The process in accordance with claim 16, further comprising the step of providing bearing means on said carrier means so that said carrier means is stabilized during movement.

22. A process for transducing a mechanical movement responsive to a fluid flow control means to an electrical output, comprising the steps of inserting a shaft of permanent magnet material in an aperture of a housing, said shaft having carrier means secured to said shaft and said carrier means having contactor means, sealing fluid tight openings within wall means in order to secure electrical connection means to a circuit means disposed on said wall means, sealing said wall means to said housing to enclose an opening in said housing and prevent leakage of fluid from said housing through the interface of said wall means with said housing, magnetically coupling said shaft to means for effecting longitudinal movement of said shaft responsive to said fluid flow control means, longitudinally moving said shaft to effect movement of said contactor means along said circuit means and thereby producing a variable electrical output.

* * * * *